United States Patent
Kuzkin et al.

(10) Patent No.: US 10,187,322 B1
(45) Date of Patent: Jan. 22, 2019

(54) PROVISIONING APPLICATIONS USING A CONNECTORS HUB SERVICE

(71) Applicant: Ingram Micro Inc., Irvine, CA (US)

(72) Inventors: Maxim Kuzkin, Moscow (RU); Vladimir Grebenschikov, Moscow (RU)

(73) Assignee: Ingram Micro, Inc., Irvine, CA (US)

( * ) Notice: Subject to any disclaimer, the term of this patent is extended or adjusted under 35 U.S.C. 154(b) by 184 days.

(21) Appl. No.: 15/005,151

(22) Filed: Jan. 25, 2016

(51) Int. Cl.
*G06F 15/173* (2006.01)
*H04L 12/911* (2013.01)
*H04L 29/08* (2006.01)

(52) U.S. Cl.
CPC ............ *H04L 47/783* (2013.01); *H04L 67/16* (2013.01)

(58) Field of Classification Search
CPC .............................. H04L 47/783; H04L 67/16
USPC .......................................................... 709/226
See application file for complete search history.

(56) References Cited

U.S. PATENT DOCUMENTS 9,455,876 B1 * 9/2016 Grebenschikov ....... H04L 41/20

OTHER PUBLICATIONS

Chevignard, "The APS Standard: Interesting for APIs?", ProgrammableWeb, Dec. 12, 2012.*

* cited by examiner

*Primary Examiner* — Wing F Chan
*Assistant Examiner* — Joseph R Maniwang
(74) *Attorney, Agent, or Firm* — Ice Miller LLP

(57) ABSTRACT

A system for provisioning applications using a Connectors Hub service is provided. At least one Service Automation module is connected to the single Connectors Hub service, which receives service APIs from a service cloud via an independent software vendor (ISV) connector. This architecture improves upon the conventional system, where a number of services are provisioned using multiple connectors located on each of the Service Automation modules. The Connectors Hub service includes a service module coupled to the statistics database. A service connector provides a service API from the ISV service cloud. This API can be directed to proxies within the Connectors Hub service, because the same service API can be used for the same service from different service providers. The proxies collect analytics data for each service provider and pass this data to the service module for generating bills for the providers based on service usage.

12 Claims, 11 Drawing Sheets

PROVISIONING APPLICATIONS USING A CONNECTORS HUB SERVICE

BACKGROUND OF THE INVENTION

Field of the Invention

This invention relates to a method for service provisioning in hosting systems, and in particular, to provisioning services and applications using Connectors Hub services.

Description of the Related Art

Applications that conform to the Application Packaging Standard (APS) are typically installed by a provider on a customer site upon request, including the applications' versions and deployment parameters that should conform to usability and security requirements. In order to install complex enterprise applications geared to a particular user. a description of requirements of the execution environment is needed. Then, the execution environment is configured and the application is installed, provided that compliance of interfaces of the execution environment and of the application is achieved. The execution environment is determined and the application needs to be configured in order to comply with the execution environment.

A modern trend of software usage presents some challenges with regard to describing execution requirements of the applications or sets of applications that are not adequately described in specification documents, but may be simply connected to almost any cloud service. This presents a problem since, complex software products may need to be deployed in different real or virtual software execution environments residing on multiple hardware nodes having various configuration parameters.

Each application, according to an Application Packaging Standard (APS), carries some business concept within it. This application business logic is represented as resource diagram in the APS. FIG. 1 illustrates an example of a conventional architecture used for application provisioning. Providers load application(s) with its resources onto a service automation module 130 via respective provider panels 120 and 125. The service automation module 130 has an APS controller 140 configured to receive execution environment parameters from a customer provided over respective customer panels 170 and 175.

The APS controller 140 configures the application according to the execution environment parameters by executing configuration services (service APIs) received from respective service clouds 180 and 185 into service connectors 150 and 155. The independent service vendors—ISV (i.e., software developers) provide the configuration services to the service clouds 180/185 over the ISV panel 190. Then, the APS controllers 140 configure the applications using the services 180 and 185 provided by the respective service connector 160 and 165. The APS controllers 130 generate APS packages provisioned to the customers. As can be seen from FIG. 1, this system is inefficient, because a separate service connector is needed for each service automation module. This requires additional time and labor resources. Another problem is that, as shown in FIG. 1, the connectors reside on a provider's site. Therefore, a vendor has to connect to each provider for updating, changing, deleting, and other operations with the service. In addition, a vendor has to have contracts with each of the providers. These problems also require additional time and labor resources.

Accordingly, an efficient method and system for service automation and provisioning applications to customers.

SUMMARY OF THE INVENTION

Accordingly, the present invention is related to a method for provisioning applications using connectors hub services that substantially obviates one or more of the disadvantages of the related art.

In one aspect of the invention, a method and system for provisioning applications using a Connectors Hub service is provided. At least one Service Automation module is connected to a single Connectors Hub service, which sends service APIs to a service cloud and vice versa via an independent software vendor (ISV) connector. This architecture improves upon the conventional system, where a number of services are provisioned using multiple connectors located on the Service Automation modules. The proposed architecture is more efficient in terms of traffic and resource utilization.

According to an exemplary embodiment, the Connectors Hub service includes a service module coupled to the statistics database. A service connector provides a service API from the individual software vendor (ISV) service cloud. This API can be directed to proxies within the Connectors Hub service, because the same service API can be used for the same service from different service providers. The proxies collect analytics data for each service provider and pass this data to the service module for generating bills for the providers based on service usage.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings:

FIG. 1 a conventional architecture for service automation and provisioning of applications;

DETAILED DESCRIPTION OF THE PREFERRED EMBODIMENTS

Figure 1:
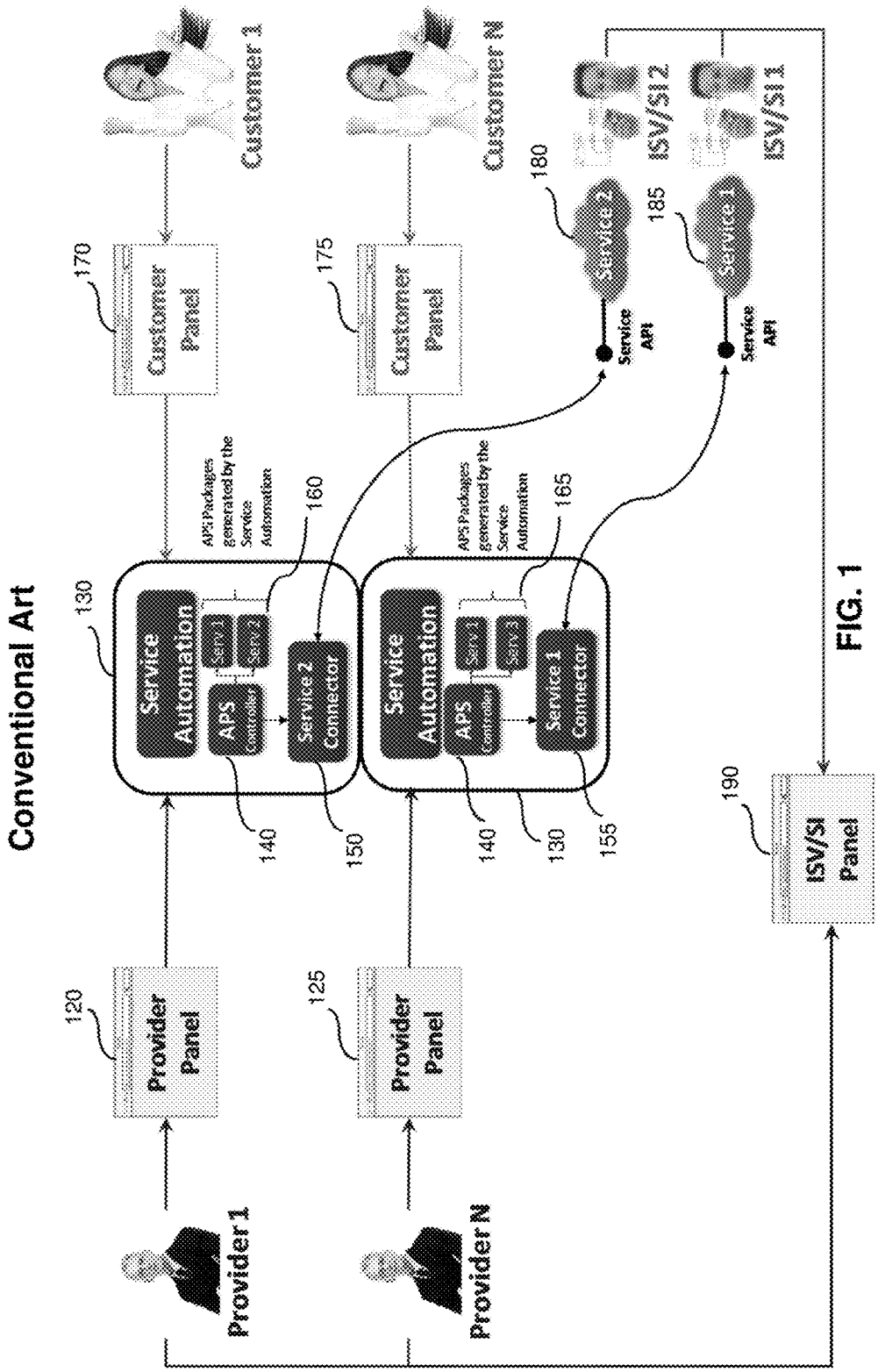

Reference will now be made in detail to the preferred embodiments of the present invention, examples of which are illustrated in the accompanying drawings.

The present invention is directed to a method for provisioning applications using a Connectors Hub services. The following definitions are used throughout the description.

A service provider is an entity, which provides service subscriptions to its clients (i.e., enterprises or customers of different size). The service provider can host services that are subscribed to by the clients. Additionally, the service provider can provide subscriptions to applications and services located on the independent software vendors' hosting servers. The second scenario is addressed by an exemplary embodiment. A provider has a service automation module installed in order to support sales and subscriptions to the services.

A Service Automation module provides a user platform (i.e., interface), which allows a user to acquire subscriptions to various services from different independent software vendors (ISVs) and to automatically configure these services according to user execution environments. The configuration is optimized by storing user parameters and configuring different applications and services for this user based on the stored user parameters. Thus, user parameters can be applied to configuration of different services from different ISVs.

Independent software vendors (ISVs) are software development companies that develop, support and run services (usually on their clouds). The ISVs also sell and provide subscriptions to their services. The ISV provides an application programming interface (API) for each of its services. The API includes a set of classes, procedures, functions, structures and constants provided by the service for use in external applications.

Connectors are located on a cloud. The ISVs need to apply user data and configuration settings required for functioning of their service on the end-user (i.e., customer) site. The ISVs use a service automation provider for configuration of their services for the end-users. In other words, the ISVs integrate their services with the Service Automation module for establishing a stable channel for provisioning their products to the end-users. A connector is a set of commands that allow, on the one hand, for receiving data and API calls from a Service Automation platform, and on the other hand, to pass them to the service provider for configuration and provisioning of the service. A particular connector is usually provided for a particular service. However, if a group of services by the same vendor use the same API, one shared connector can be used for these services. Each connector has a certificate signed by the service provider for which the connector is allocated.

However, as discussed above, having a special connector for each service provisioned by the Service Automation module is inefficient and costly. According to the exemplary embodiment, a cloud-based Connectors Hub service is implemented. The Connectors Hub service includes a database or a list containing names of the service providers connected to the Connectors Hub service. The Connectors Hub service communicates with the Service Automation module over a secure channel.

When a provider is connected to the Service Automation system, the provider registers with the Connectors Hub service and provides documents defining an interface of the Service Automation module. Thus, the business relationship between the service provider and the Connectors Hub service is established. The Connectors Hub service identifies a source of requests based on the data received from the service provider. The documents contained in the Connectors Hub service database reflect the specific interface of the Service Automation module. In one embodiment, these documents can be placed into the database, initially since both of the entities are produced by the same developers. Typically, the specification documents are supplied to the Connectors Hub service by the provider.

Then, the managers of the Connectors Hub service add some configuration data to the specification documents required for integration of the connector into the Connectors Hub service. The configuration documents are provided by the Connectors Hub service to individual software vendors (ISVs) who develop the connector. The specification documents can be acquired from the site of the Connectors Hub service. A connector developer can click on a link to the specification document stored in the Connectors Hub service database. Additionally, the managers of the Connectors Hub service can provide the specification data to an interested developer of the connector service.

After the service developer produces the connector for his service based on the specification, he places the connector on the cloud. The connectors can be produced by third-party developers in response to orders from the service developers. An address of the connector on the cloud is provided to the Connectors Hub service by the developer. Upon receiving the connector's address, the Connectors Hub service sends a standard API request greeting. The connector responds by sending a data package containing developer's data, service name, an allowed number of the requests to the connector, and an identifier of a provider of the Service Automation module for which the connector (i.e., developer, version, etc.) is allocated. In one exemplary embodiment, a response of the connector to the API request from the Connectors Hub service represents an additional configuration data entered by the manager of the Connectors Hub service prior to communicating with the connector.

Upon the connector's response to the API call from the Connectors Hub service, the database of the Connectors Hub service is populated by:

1. a name of the developer of the service, to which the connector is allocated;

2. a name of the service;

3. a location of the connector on the cloud;

4. a number of possible requests allowed for the connector according to a pre-set request rate;

5. an identifier of the Service Automation module, for which the connector is allocated.

According to the exemplary embodiment, the Connectors Hub service accumulates an array of the above data reflecting various connectors. After the communication with the connectors is established, the Connectors Hub service generates a catalog of available services for the Service Automation module. In other words, as soon as communication with the connector is established, the modules of the Service Automation, for which the connector is allocated, receive data for integrating an interface for using a new service associated with the connector into the interface of the Service Automation module.

Figure 2:
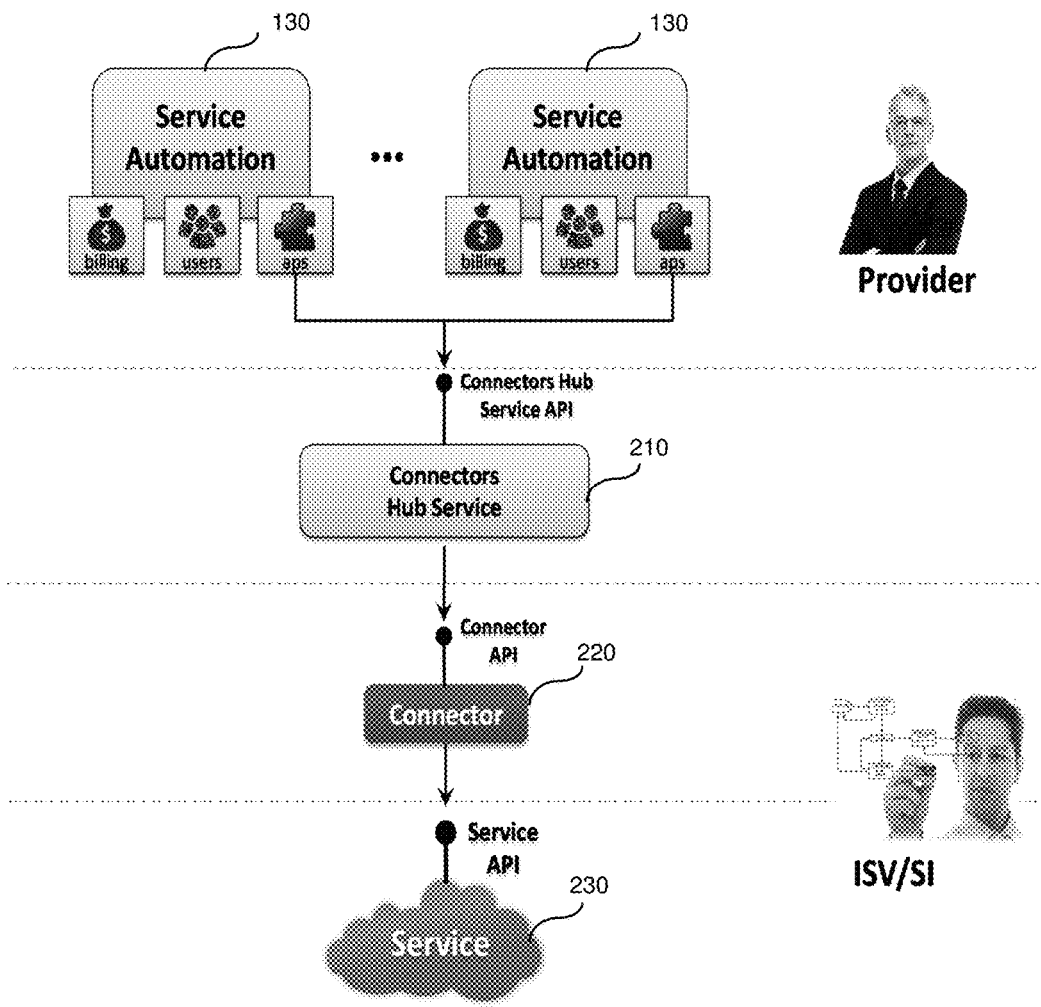
FIG. 2 illustrates a general architecture of a Service Automation system with a Connectors Hub service, in accordance with the exemplary embodiment.

FIG. 2 illustrates a general architecture of a Service Automation system with the Connectors Hub service, in accordance with the exemplary embodiment. According to the exemplary embodiment, a number of Service Automation modules 130 are connected to the single Connectors Hub service 210, which receives service APIs from a Service Automation system and sends them to a service cloud 230 via a connector 220. Only one service and one connector are shown in this example. However, this architecture improves upon the conventional one depicted in FIG. 1, where a number of services are provisioned using multiple connectors located on each of the Service Automation modules. The proposed arrangement is more efficient in terms of traffic and resource utilization. It also provides for additional functionality provided at a central location outside of the Service Automation modules. Also, a vendor does not have to establish communications with each of the providers. Note that communications between the Connectors Hub service 210 and the connector 220 is not defined (i.e., not regulated by a particular API). For example, the any API that depends on the service can be used. It is solely based on the requirements of the individual Connectors Hub service 210. However, the communication between the Service Automation modules 130 and the Connectors Hub service 210 is well defined by a proprietary API.

Figure 3:
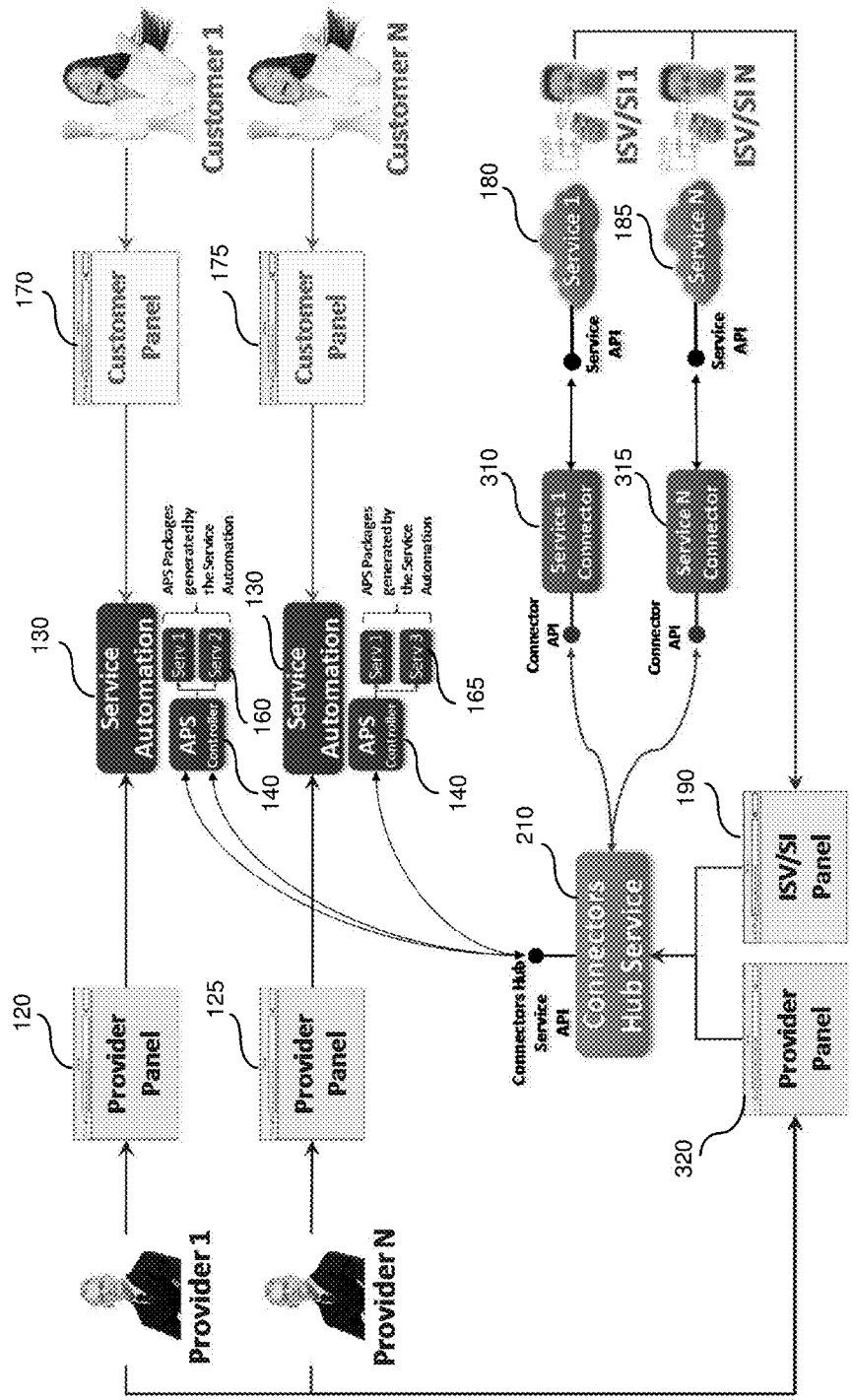
FIG. 3 illustrates a detailed architecture and a workflow of a Service Automation system with the Connectors Hub service, in accordance with the exemplary embodiment.

FIG. 3 illustrate a detailed architecture and a workflow of a Service Automation system with the Connectors Hub service, in accordance with the exemplary embodiment. Providers can access the service automation modules 130 via respective provider panels 120 and 125. The service automation modules 130 have an APS controller 140 configured to receive execution environment parameters from a customer provided over respective customer panels 170 and 175.

The APS controllers 140 configure the application(s) according to the execution environment parameters by executing the Connectors Hub services (service APIs) received from respective service clouds 180 and 185 via their allocated service connectors 310 and 315. The independent service vendors—ISVs (i.e., software developers) provide the services to the service clouds 180/185. Then, the providers receive the respective service APIs via a provider panel 320 from the Connectors Hub services 210 via a provider panel 320 into their APS controllers 140 and configure the APS controllers 140 using the services 180 and 185 provided by the respective service connectors 310 and 315. The APS controllers 130 generate APS packages provisioned to the customers. Note that the APS controllers 140 sort out the API calls to the APS packages.

As can be seen from FIG. 3, this system is more efficient, because a separate service connector is not needed for each Service Automation module. Instead, a single Connectors Hub service 210 is used. An ISV/SI panel 190 integrates services 180 and 185 in order to provide them to the Connectors Hub Service 210. In order for the providers to acquire services (and to ultimately sell the services to the customers) from the Connectors Hub Service 210, the providers subscribe to the services via the provider panel 320. The providers also acquire (via the provider panel 320) special components for integration with the Connectors Hub Service 210. Note that the APS controllers 140 sort out the API calls to the APS packages.

This, advantageously, reduces the network traffic and resource utilization. The statistics collected by the Connectors Hub service 210 are used for centralized billing.

Figure 4:
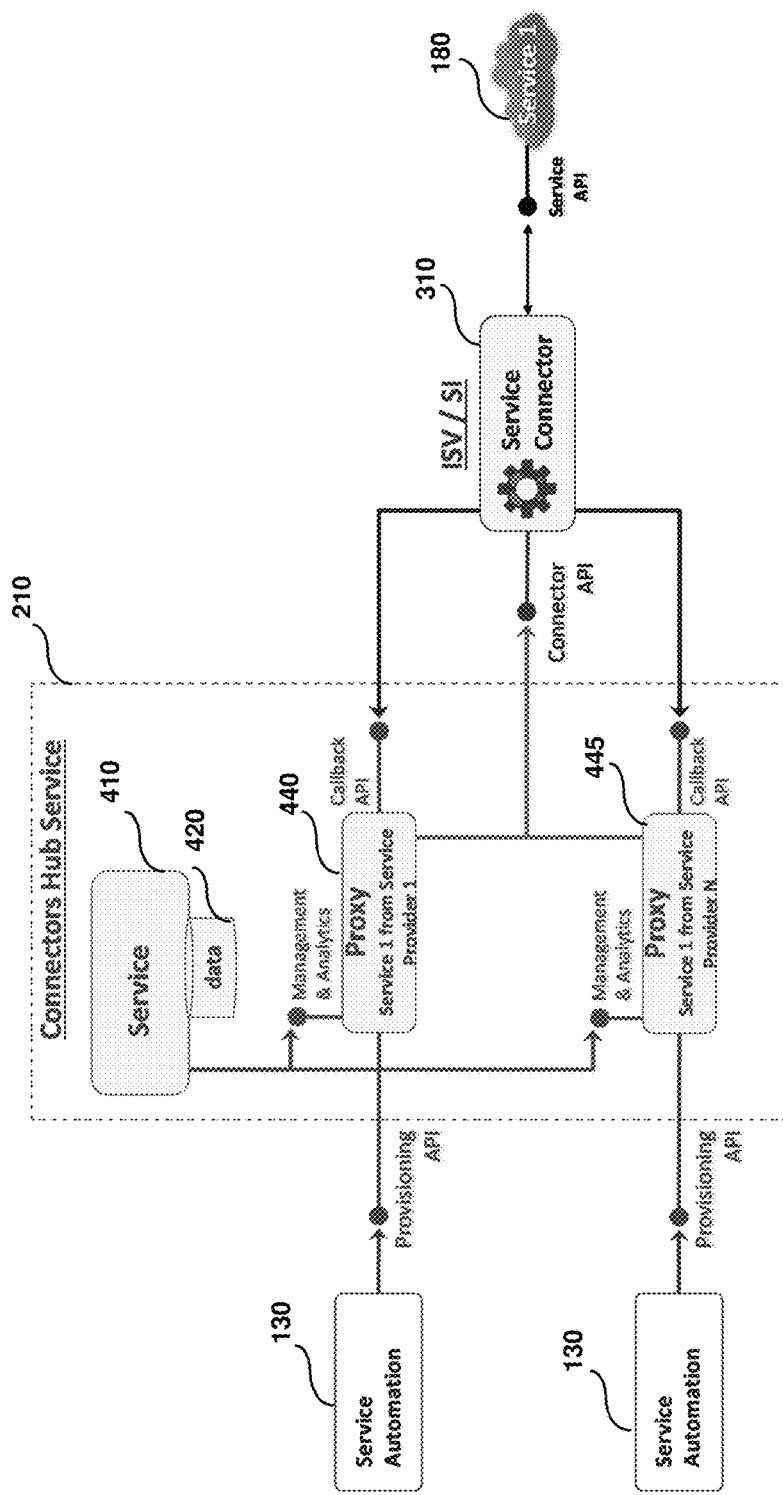
FIG. 4 illustrates implementation of the Connectors Hub service, in accordance with the exemplary embodiment.

FIG. 4 illustrates implementation of the Connectors Hub service, in accordance with the exemplary embodiment. According to the exemplary embodiment, the Connectors Hub service 210 includes a service module 410 coupled to the statistics database 420. The Service Automation module 130 provides a service API. This API can be directed to proxies 440 and 445 because the same service API can be used for the same service 1 from different service providers (e.g., service provider 1 and service provider N). The proxies 440 and 445 collect analytics data for each service provider and service and pass this data to the service module 410 for generating bills for the providers based on service usage. Then, the proxies 440 and 445 provide the APIs to a corresponding service connector 310. One of the main roles of the proxies 440 and 445 is to direct the API calls to an appropriate service connector. After that, the API calls are directed to the service 180. Likewise, the service 180 provides a callback service APIs via a corresponding service connector 310. Then, the callback APIs are directed to the proxies 440 and 445 and to the Service Automation module 130 based on the API calls. The proxies 440 and 445, advantageously, hide the credentials used for connecting to the ISV/SI 310 from service providers (i.e., from the Service Automation modules 130).

Figure 5:
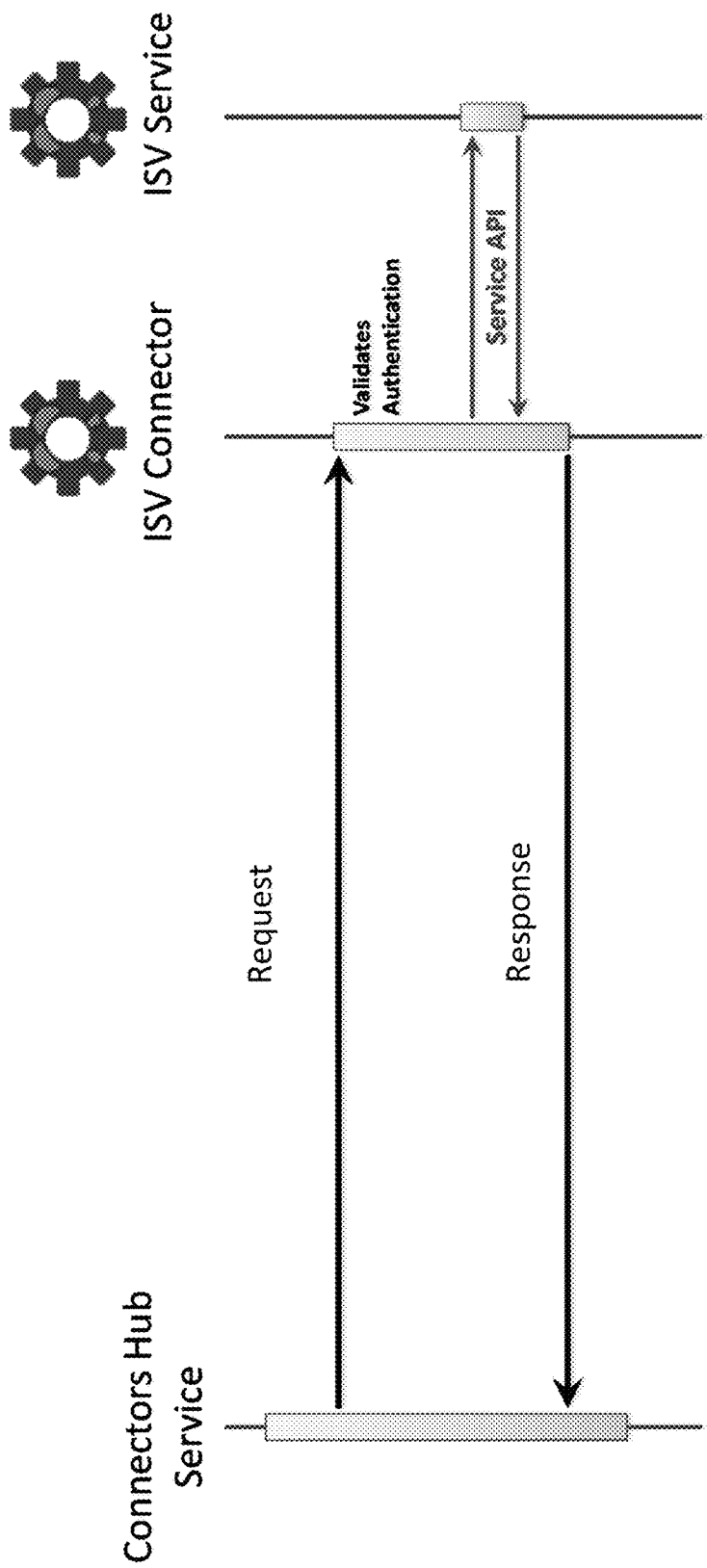
FIG. 5 illustrates communication between the Connector Hub service and independent software vendor service, in accordance with the exemplary embodiment.

FIG. 5 illustrates communication between the connector hub service and independent software vendor service, in accordance with the exemplary embodiment. Since the connector is developed using the specification of the interface of the Service Automation module, the API requests from the Service Automation module are correctly processed by the connector. The Connectors Hub service can operate if at least one connector is present and at least one provider is registered. According to the exemplary embodiment, the Connectors Hub service receives an API request from the Service Automation module. The request contains data for identifying the sender and the service associated with this request. The Connectors Hub service searches in its database for and address of a corresponding connector and redirects the request to this connector. The following request structure is used:

POST/Subscription
{
"aps": {
    "id": "oa-generated-uuid"
},
"account": {
    {oa-account},
    "adminContact": {admistrative-contact}
},
"subscription": {
    {oa-subscription},
    "resources": app-resources-limits
},
. . .
}
counter1: {usage: 0, limit: 100}
Where:
{oa-account}—references the account resource;
{oa-subscription}—references the subscription resource;
{admistrative-contact}—contains the details of an administrator contact information,
[app-resources-limits]—a list of resource limits.

Subsequently, the connector executes this request by turning on a provisioning of the service with certain configurations. After the request is executed, the connector sends a following response to the Connectors Hub service:
{
"aps": {
"id": " . . . "
},
"customId": "My-ID",
"counter1": { . . . }

The Connectors Hub service receives a response that the request is executed and sends it to the provider. In case of an error of executing the API request by the connector, the connector sends an error code to the Connectors Hub service. The Connectors Hub service save these error codes in its database. Thus, the Connectors Hub service database contains connectors' error codes. The errors-related data can be provided to the connector developers or to the service developers upon request.

Additionally, the Connectors Hub service contains a counter for a number of uses for each of the connectors. Since all API calls go through the Connectors Hub service, it keeps statistics for a number of requests to each of the connectors. In one embodiment, the Connectors Hub service also keeps statistics of generated errors. The entire statistics data can be provided to the service vendors upon request, because these statistics can be of interest to them, since they reflect statistics of their service usage (i.e., turning on and off the services). Additionally, the statistics on a number of the requests to the connectors can be used as a basis for generating a bill for each service vendor based on the set rates for connector(s) usage.

At the same time, the statistics can be used for generating bills for using the Connectors Hub service by a provider. According to the exemplary embodiment, the Connectors Hub service executes the following functions:

1. Establishes a secured connection to the service vendors (i.e., developers) using a security certificate;
2. Forms a catalog of developers (i.e., producers) of the connectors for integration with the Service Automation module;
3. Writes locations of the connectors on the cloud into the Connectors Hub service database;
4. Generates a catalog of available services for which the connectors are created;
5. Establishes a secured connection with the provider's Service Automation module using the security certificate;
6. Loads the catalogs of the available services into the interface of the Service Automation system by integrating the service APIs into the Service Automation module;
7. Provides for data transfer and API calls received through the user interface of the Service Automation module and for translation of data format by attaching the required connectors into formats supported by the service vendors (ISVs);
8. Provides API callbacks from the service vendors (ISVs) to the Service Automation module;
9. Counts a number of requests (calls) to each of the connectors and records this data into its database;
10. Calculates an aggregate number of calls to the services of a particular vendor (ISV), generates trends, processes the statistics and provides them to the ISVs; and
11. Generates the bills for connector usage for each of the ISVs using a recorded number of calls and service rates set by the ISVs;
12. Logs connector access and operational errors;
13. Provides error statistics to the ISVs.

According to one exemplary embodiment, the Connectors Hub service passes commands from the provider to the user in such a way that the Connectors Hub controls provisioning of the services—if the service is paid for, the command is allowed through the Connectors Hub and disallowed otherwise. In one embodiment, the Connectors Hub has translators, switches and control input/output points that can be affected by the provider. In another embodiment, the provider has a Connectors Hub catalog for each resource. The hubs from the catalog transform signals from one interface into signals of different interfaces associated with the hubs.

According to one exemplary embodiment, the additional translators within the hub can be configured not to a particular service (application), but to a platform. For example, the hub translator can transform an Android™ API into an iPhone API, or the hub translator can allow transferring HDMI or USB over TCP. According to one exemplary embodiment, all hubs are certified by the same authority and only certified providers can use them. The Connectors Hub can also be implemented as a multiplexor. This Connectors Hub can resolve management issues for the ISVs without accessing the Service Automation module.

In one embodiment, a universal Connectors Hub has a translation table for translation of different interface formats. If translation generates an error (i.e., a command is not recognized), the hub accesses a knowledge base and attempts to solve the conflict by performing an update. The table can contain provider-specific data and can be stored on the provider side.

Figure 6:
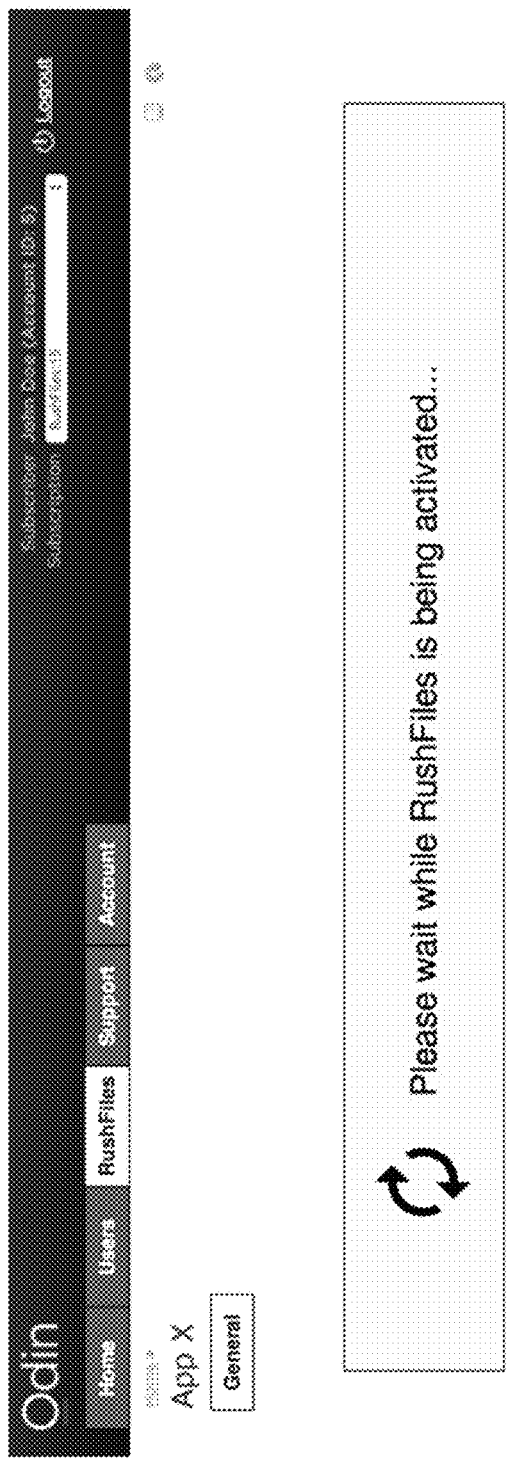
FIG. 6 illustrates a screen shot of an application provisioning screen.

FIG. 6 illustrates a screen shot of application provisioning screen. The process depicted in FIG. 4 takes place and the progress screen is depicted to the user prior to rendering the screen depicted in FIG. 7.

Figure 7:
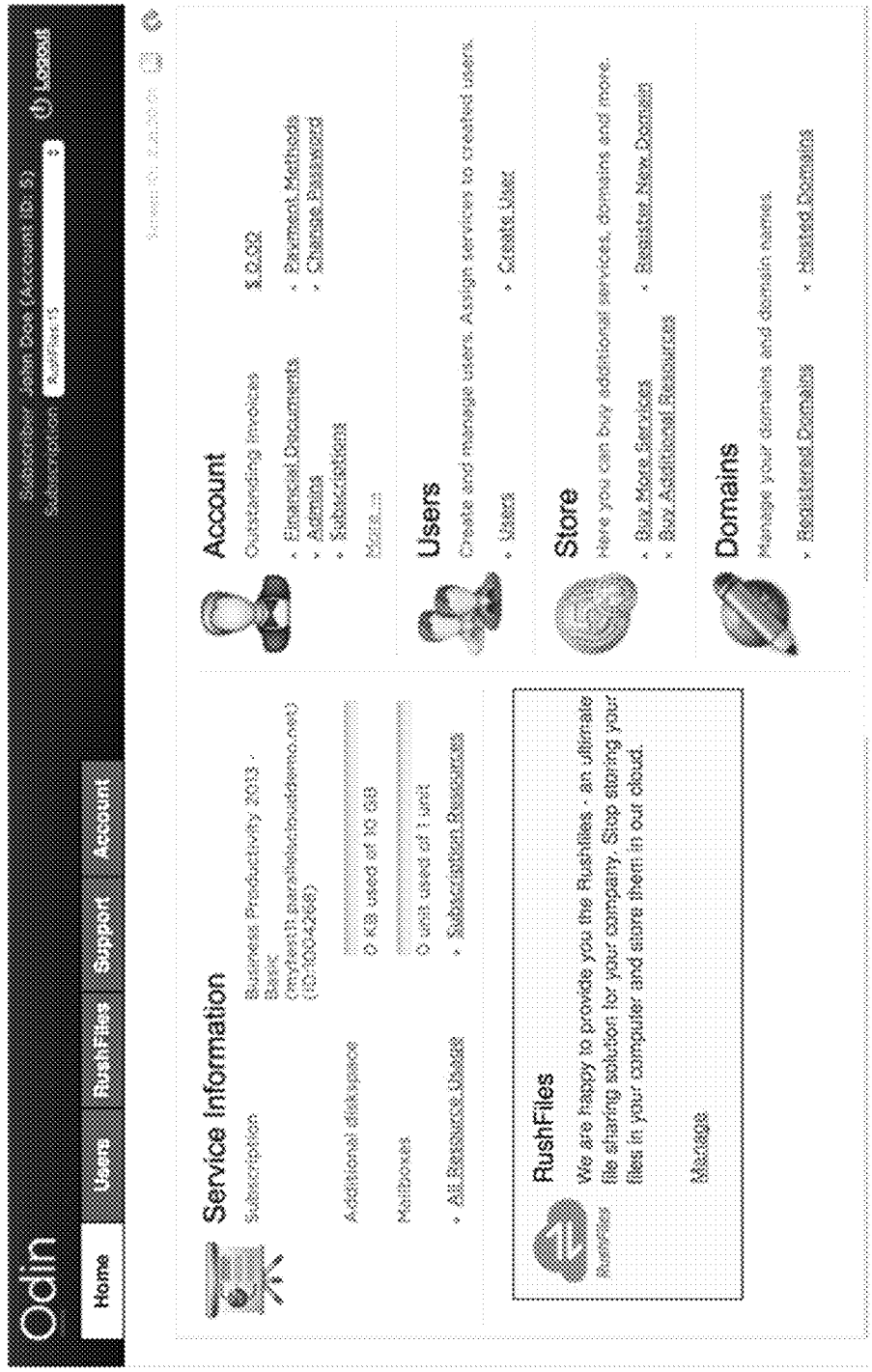
FIG. 7 illustrates a screen shot of a home dashboard for a Service Automation application.

FIG. 7 illustrates a screen shot of a home dashboard for service automation application. This screen shot illustrates an application integrated with a control panel of the Service Automation module. This dashboard is rendered to the end user, who bought an application (e.g., "RushFiles") from a provider. After the user bough the RushFiles application, he receives a package, which provides the interface depicted in FIG. 6.

Figure 8:
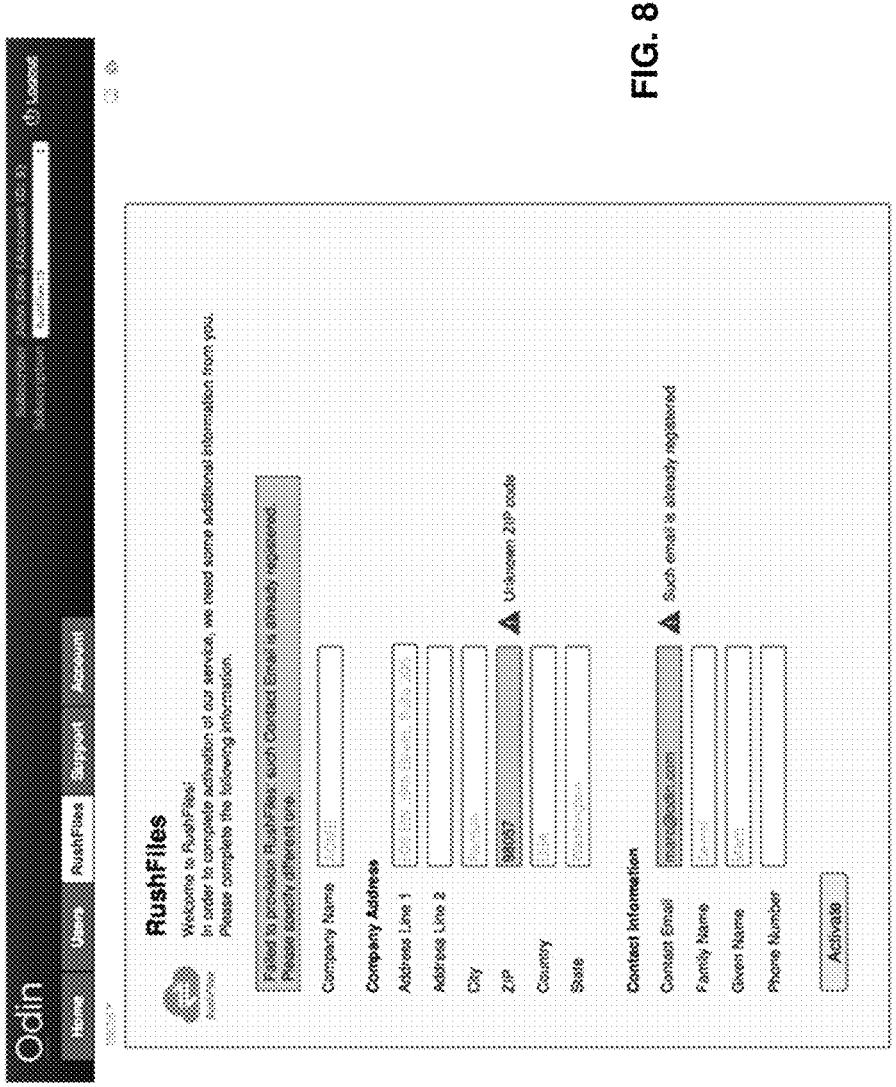
FIG. 8 illustrates a screen shot of an application screen indicating that provisioning has failed.

FIG. 8 illustrates a screen shot of an application screen indicating that provisioning has failed. If a connector returned an error, this screen allows a user to re-enter his credentials etc.

Figure 9:
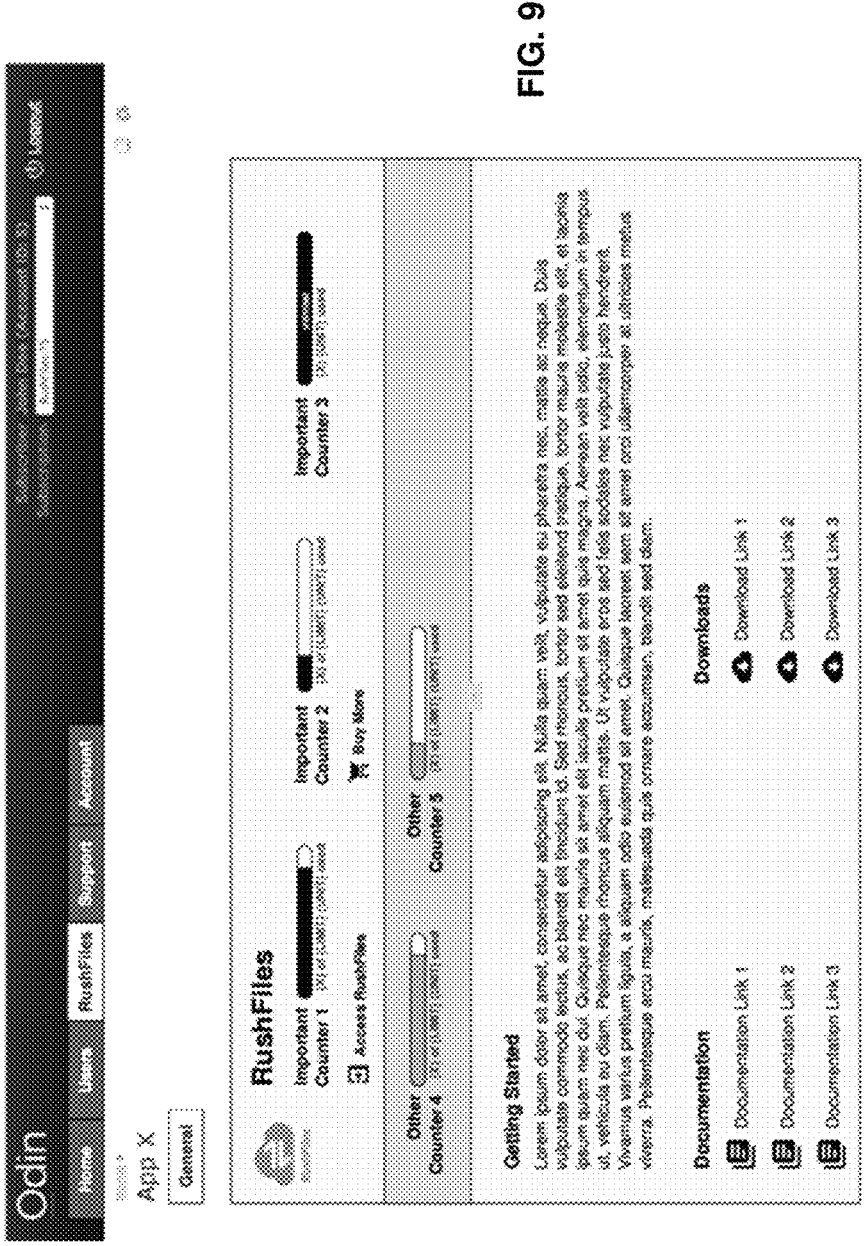
FIG. 9 illustrates a screen shot of an application management screen.

FIG. 9 illustrates a screen shot of an application management screen displaying a provisioned application RushFiles.

Figure 10:
FIG. 10 illustrates a screen shot of accounting data mapping.

FIG. 10 illustrates a screen shot of accounting data mapping. This illustrates an error report generated by the Connectors Hub Service.

Figure 11:
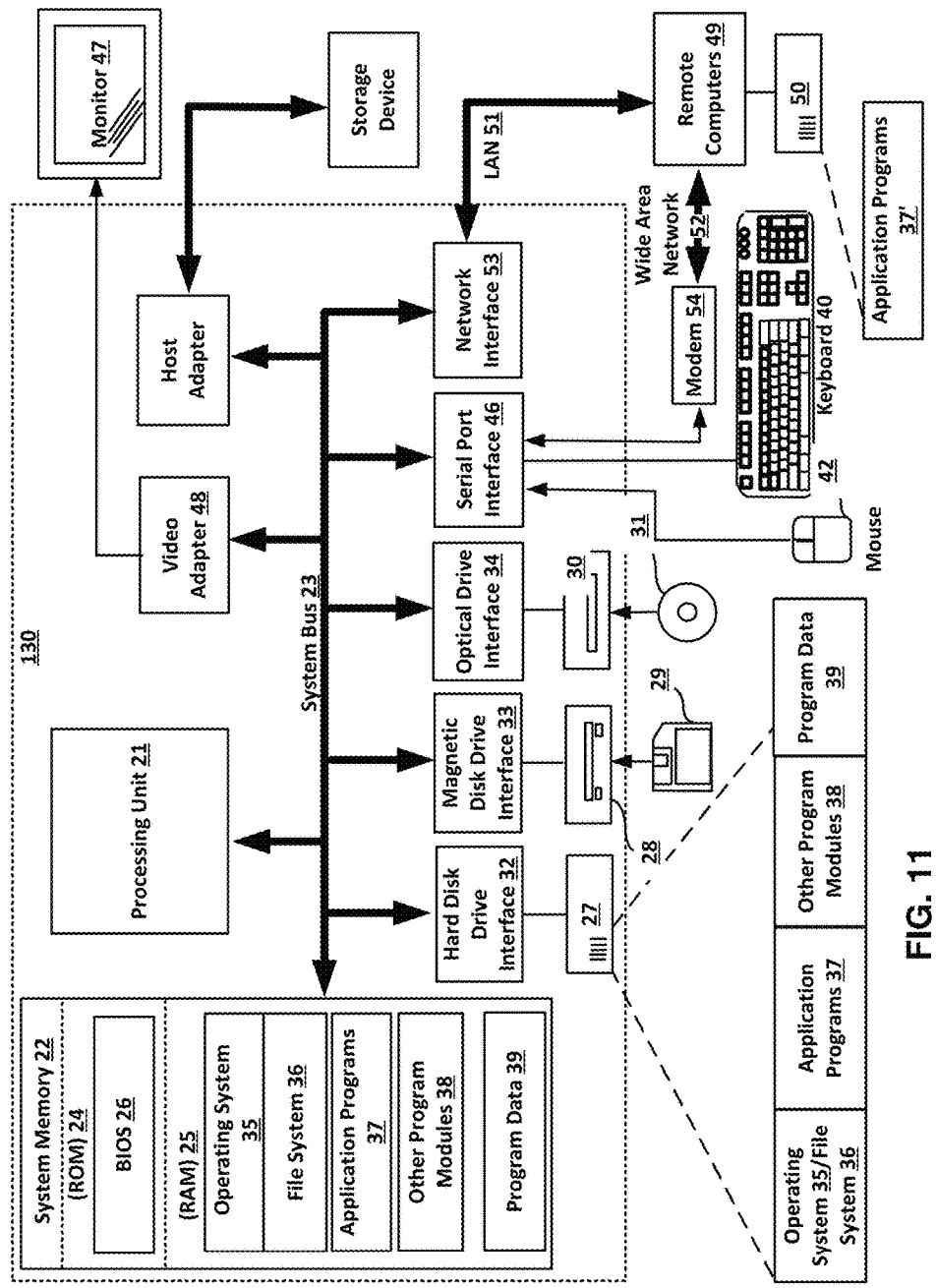
FIG. 11 illustrates a schematic of an exemplary computer system that can be used for implementation of the invention.

With reference to FIG. 11, an exemplary system for implementing the invention includes a general purpose computing device in the form of a computer system/server 130 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the server 130, such as during start-up, is stored in ROM 24.

The computer/server 130 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer/server 130.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer/server 130 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer/server 130 may operate in a networked environment using logical connections to one or more remote computers 49. The remote computer (or computers) 49 may be another computer, a server, a router, a network PC, a peer device or other common network node, and typically includes many or all of the elements described above relative to the computer/server 130, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 130 is connected to the local network 51 through a network interface or adapter 53. When used in a WAN networking environment, the computer/server 130 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer/server 130, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A global system for provisioning services using a Connectors Hub, the system comprising:
   at least one service automation module residing on a provider cloud configured to provision provider services acquired from an independent software vendor (ISV) according to an application packaging standard (APS);
   a plurality of ISV connectors residing on a service cloud configured to channel a plurality of application programming interface (API) calls and to translate formats of service provisioning requests between the service automation module and ISV services; and
   a connectors hub service located on a cloud and configured to connect the service automation module and the ISV services and to route provisioning, configuration and management commands between the service automation module and the ISV via corresponding ISV service connectors,
   wherein:
   the connectors hub service provides a service catalog for integration into the service automation module;
   the connectors hub service provides the API calls from the service cloud to APS controllers and from the APS controllers to the service cloud;
   the connectors hub service provides a single point of connection to a plurality of ISV connectors;
   the connectors hub service is configured to provide secure connection between the service automation module and the ISV services;
   the connectors hub service is configured to audit and generate usage trends of the ISV services by monitoring ISV connectors calls;
   the connectors hub service is configured to resolve management issues for the ISVs without accessing the service automation module.

2. The system of claim 1, further comprising a database connected to the connectors hub service configured to provide routing and configuration data for provisioning of ISV services.

3. The system of claim 2, wherein the database contains any of:
   a name of an ISV of the service, to which the connector is allocated;
   a name of the ISV service;
   a location of the connector on the cloud;
   a number of possible requests allowed for the connector; and
   an identifier of the service automation module, for which the connector is allocated.

4. The system of claim 2, wherein the database contains a log of connectors' errors.

5. The system of claim 1, wherein the connectors hub is implemented as a multiplexor configured to resolve management issues using a translation table.

6. The system of claim 1, wherein the connectors hub is certified by a certification authority and only providers certified by the same authority can access the connectors hub.

7. A computer-implemented method for provisioning services using a connectors hub, the method comprising:
- establishing a secure connection to an independent service vendor (ISV) using a security certificate;
- forming a catalog of ISV connectors residing on a cloud for integration with a service automation module;
- generating a catalog of available service for which the ISV connectors are created;
- writing locations of the connectors on the cloud into a connectors hub service database;
- establishing a secure connection with a provider using the security certificate;
- loading a catalog of available services into an interface of a service automation system by integrating service application programming interfaces (APIs) into the service automation module;
- providing for a data transfer and service API calls received through the interface of the service automation module and for translation of a data format by attaching required connectors into formats supported by the ISV;
- counting a number of requests to each of the connectors and recording this data into a database;
- calculating an aggregate number of requests for the services of the ISV and generating trends and statistics and providing them to the ISV;
- generating bills for connector usage for each of the ISVs using a recorded number of the requests and service rates set by the ISV; and
- channeling the service API calls from the service cloud to APS controllers.

8. The method of claim 7, further comprising establishing the secure connection with the provider using a different security certificate for each of the providers.

9. The method of claim 7, further comprising identifying the provider based
on a security certificate provided by the provider.

10. The method of claim 7, further comprising establishing the secure connection to the ISVs using a different security certificate for each of the ISVs.

11. The method of claim 7, further comprising logging connectors access and operational errors.

12. The method of claim 7, further comprising providing error statistics to the ISVs.

* * * * *